(12) United States Patent
Miller

(10) Patent No.: US 6,366,618 B1
(45) Date of Patent: Apr. 2, 2002

(54) METHOD AND APPARATUS PROVIDING HIGH QUALITY HIGH LEVEL SIGNALS USING LOW VOLTAGE INTEGRATED CIRCUIT DRIVERS BY SUMMING PARTIAL SIGNAL CURRENTS AND MAGNETOMOTIVE FORCES

(75) Inventor: Larry D. Miller, San Mateo, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/034,733

(22) Filed: Mar. 4, 1998

(51) Int. Cl.$^7$ ................................................ H04B 3/00
(52) U.S. Cl. ...................................... 375/258; 375/295
(58) Field of Search ................................ 375/222, 257, 375/258, 295; 307/106; 340/310.01, 310.06; 363/59, 65

(56) References Cited

U.S. PATENT DOCUMENTS

| | | | | |
|---|---|---|---|---|
| 4,556,927 A | * | 12/1985 | Steger | 361/215 |
| 4,682,114 A | * | 7/1987 | Aucouturier et al. | 327/179 |
| 4,845,606 A | | 7/1989 | Herbert | 363/24 |
| 5,038,051 A | * | 8/1991 | Firman et al. | 307/106 |
| 5,093,646 A | | 3/1992 | Herbert | 336/225 |
| 5,103,187 A | * | 4/1992 | Durand et al. | 330/43 |
| 5,200,930 A | | 4/1993 | Rouquette | 367/76 |
| 5,406,495 A | | 4/1995 | Hill | 702/72 |
| 5,426,360 A | | 6/1995 | Maraio et al. | 324/126 |
| 5,465,272 A | * | 11/1995 | Smith | 375/295 |
| 5,671,110 A | | 9/1997 | McCartney et al. | 361/42 |
| 5,677,833 A | | 10/1997 | Bingley | 363/71 |

* cited by examiner

Primary Examiner—Stephen Chin
Assistant Examiner—Chieh M. Fan
(74) Attorney, Agent, or Firm—Blakely Sokoloff Taylor & Zafman, LLP

(57) ABSTRACT

A method and an apparatus providing high level signals by summing partial signal currents and magnetomotive forces. In one embodiment, an isolation transformer having a 1:1 turns ratio and a plurality of separate primary windings is utilized. A plurality of independently controlled current generators are coupled to each separate primary winding with appropriate terminations such that the data communications circuit is impedance matched across the entire system. The isolation transformer sums the partial currents and magnetomotive forces in each separate primary winding such that a higher level high quality signal is produced in the secondary winding. As such, high quality high level data communications signals are produced with the described data communications circuit from low voltage level signals.

25 Claims, 7 Drawing Sheets

METHOD AND APPARATUS PROVIDING HIGH QUALITY HIGH LEVEL SIGNALS USING LOW VOLTAGE INTEGRATED CIRCUIT DRIVERS BY SUMMING PARTIAL SIGNAL CURRENTS AND MAGNETOMOTIVE FORCES

BACKGROUND OF THE INVENTION

1. Field of the Invention

The present invention relates generally to data communications and, more specifically, the present invention relates to low voltage integrated circuits transmitting data over higher voltage communications lines.

2. Background Information

As the speeds of electronic circuits increase, there is a continuing trend to reduce the operating voltage of the integrated circuits from the traditional 5 volt DC power supply. For instance, present day integrated circuits commonly operate at approximately 3.3 volts and 2.2 volts. Lower voltage integrated circuits will soon be desired to accommodate higher integrated circuit speeds in the near future. However, many existing communications systems require 5 volt peak-to-peak signals that cannot be easily produced by these lower voltage integrated circuits.

At the present time, there are some known methods of producing higher voltage data communications signals, such as for example 5 volt peak-to-peak signals, with lower voltage integrated circuits, such as for example approximately 3.3 volts or lower. However, most known methods suffer from a variety of problems including undue amounts of noise and interference, and/or are impractical to implement.

FIG. 1A is a schematic of one known method of producing higher voltage level data communications signals with lower voltage integrated circuits. A data communications circuit is illustrated with an isolation transformer 101 including a center-tap 103 coupling primary winding 105 to Vcc. Primary load resistors 109 and 111 are coupled between center-tap 103 and the respective ends of primary winding 105 of transistor 101. A data communications line 121 is coupled to the ends of secondary winding 107. As shown in FIG. 1B, the characteristic impedance $Z_0$ of data communications line 121 may be alternatively represented as a secondary load resistor 115, which would be coupled in parallel across the ends of secondary winding 107. Two current sinking drivers 117 and 119 are connected to the ends of primary winding 105.

One problem with the data communications circuit illustrated in FIG. 1A is that center tap 103 results in inherent second harmonic distortion, which manifests as common mode signal currents and attendant electromagnetic interference (EMI) problems.

With the dual current sinking drivers 117 and 119 at the transformer ends of primary winding 105, and with Vcc applied to center-tap 103, the circuit of FIG. 1A resembles a push-pull audio power amplifier in topology and current sinking drivers 117 and 119 only drive half of the primary winding 105 at a time. Since the remaining non-driven half of the primary winding 105 is rather tightly magnetically coupled, autotransformer action occurs from the non-driven winding. Consequently, all of the parasitic reactances and IR drops associated with the non-driven winding, as well as the reflected non-linear B-H magnetizing characteristic from the transistor core appear as additional loads to the driving side of the circuit. Since there is no negative feedback in the circuit, as would be used in an analogous audio power amplifier to reduce distortion, the circuit of FIG. 1A suffers from quite high harmonic distortion due to non-linear loading. At frequencies of operation occurring in networking systems, this translates into excessive EMI and loss of signal quality.

FIG. 2 is a schematic of another known center-tapped primary data communications circuit similar to the circuit shown in FIG. 1A. In particular, FIG. 2 shows an isolation transformer 201 with a center-tap 203 on primary winding 205. Data communications line 221 is coupled across the ends of secondary winding 207. A characteristic impedance of data communications line 221 is represented in FIG. 2 as a secondary load resistor 215, coupled in parallel across the ends of secondary winding 207. Two current sinking drivers 217 and 219 are connected to the transformer ends of primary winding 205. Each end of primary winding 205 is coupled to center-tap 203 through primary load resistors 209 and 211, respectively.

In order to achieve acceptable power consumption, transformer 201 of FIG. 2 is also driven in a push-pull fashion, similar to the circuit discussed above in FIG. 1A. Therefore, since the non-driven half of the primary winding 205 is rather tightly magnetically coupled, autotransformer action occurs in the non-driven half of primary winding 205, and all of its parasitic reactances and IR drops, as well as its reflected non-linear B-H magnetizing characteristic from the transformer core, appear as additional loads to the driving side of the circuit resulting in high harmonic distortion, excessive EMI and loss of signal quality.

FIG. 3 is a schematic of a known data communications circuit utilizing a step-up transformer 301. Principal problems associated with step-up transformer 301 include the increased circuit sensitivity due to step-up transformer 301 parameters and the very low impedances that result on the primary winding side of step-up transformer 301. In particular, primary winding 305 of transformer 301 is driven end-to-end by current generator 317. Primary load resistor 309 is coupled in parallel across the ends of primary winding 305. Data communications line 321 is coupled end-to-end across secondary winding 307. The characteristic impedance of data communications line 321 is represented in FIG. 3 as a secondary load resistor 315, coupled in parallel across the ends of across secondary winding 307.

As shown in FIG. 3, transformer 301 is a step-up type transformer, which enables the required higher level voltage signals to be achieved on data communications line 321 from a lower level voltage integrated circuit. Since transformer 301 is a step-up type, primary load resistor 309 must be a low impedance load in order for the impedance to be matched across the system. For instance, assuming step-up transformer 301 has a turns ratio of 1:1.41 and that the characteristic impedance 315 of the transformer line 321 is 100 ohms, current generator 317 must operate into an impedance of 50 ohms reflected through a 1:2 impedance transformation. This results in primary load resistor 309 being only 25 ohms in this example. This low impedance is very difficult to implement on a matched impedance circuit board layout.

A 1:1.41 ratio is chosen in this illustration because it is the lowest transformation ratio that is practical to use with 3.3 volt driver circuits. If an integral ratio, such as for example 1:2, were selected for step-up transformer 301, which is relatively easy to wind, current generator 317 would have to operate into an even lower load impedance. Specifically, if step-up transformer 301 has a turns ratio of 1:2, primary load resistor 309 would be 12.5 ohms in the case of a 100 ohm secondary load resistor 315.

Non-integral transformation ratios are difficult to achieve accurately with the low number of turns present on high frequency transformers. This is exacerbated by the fact that the output signal level, or launch level, of network drivers must be tightly controlled to allow proper operation of receive-end adaptive line equalizers. Thus, the resulting step-up transformer of FIG. 3 is difficult and expensive to manufacture and may have to be custom-matched with a lower voltage physical layer of a an integrated circuit. As integrated circuit voltages continued to decrease, such as for example to 2.2 volts or lower, correspondingly even higher step-up ratios and even lower drive impedances will need to be adopted if the configuration of the schematic shown in FIG. 3 is utilized.

Thus, what is desired is an method and an apparatus providing higher voltage output signals in communications lines from lower level voltage integrated circuits using transformers that do not suffer from the problems discussed above.

SUMMARY OF THE INVENTION

A data communications circuit generating higher voltage output signals using a lower voltage integrated circuit is disclosed. In one embodiment, a plurality of lower voltage contributory output signals are generated with a plurality of current generators. Each one of the plurality of lower voltage contributory output signals are coupled to a corresponding separate one of a plurality of primary windings of a pulse type transformer having an overall turns ratio of 1:1. The plurality of lower voltage contributory output signals in the primary windings are summed in a secondary winding of the pulse type transformer to generate the higher voltage output signal. A data communications line is coupled to the secondary winding. A composite impedance across the plurality of primary windings is matched with a characteristic impedance across the secondary winding. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus providing higher voltage output signals in a data communications circuit from a lower voltage level physical layer of an integrated circuit is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In the present invention, currents from a plurality of current generators in integrated circuit drivers of a lower voltage physical layer of an integrated circuit are summed in separate windings of an isolation transformer to provide a combined output signal at a higher voltage level. As a result, the present invention overcomes problems found in present day methods utilized to raise the levels of low voltage integrated circuit signals to higher voltage levels used in data communications lines. The present invention produces the higher voltage level data communications signals with superior signal wave shape characteristics.

The present invention provides a novel method and apparatus that sums up separate magnetomotive forces from separate lower voltage level physical layer current generator outputs into a single, easy to manufacture isolation transformer, which in one embodiment uses multiple identical windings. The present invention may be used with multiple digital-to-analog (D/A) converter outputs, or a single D/A converter output, driving several current generators. Since each current generator furnishes only a portion or component of the total output signal, it is possible to obtain finer control over the wave shape by using multiple D/A converter outputs and offsetting the D/A converter updates in time.

The presently described method and apparatus is impedance matched at all times throughout the entire circuit to provide an improved signaling environment. In addition, improved wave shaping is achieved, which results in lower levels of distortion and EMI in the final summed signal. In one embodiment it is possible to obtain a given fidelity of waveform shaping with D/A converters of reduced resolution and higher tolerance, thereby offering an opportunity for reduced manufacturing costs.

Figure 4:
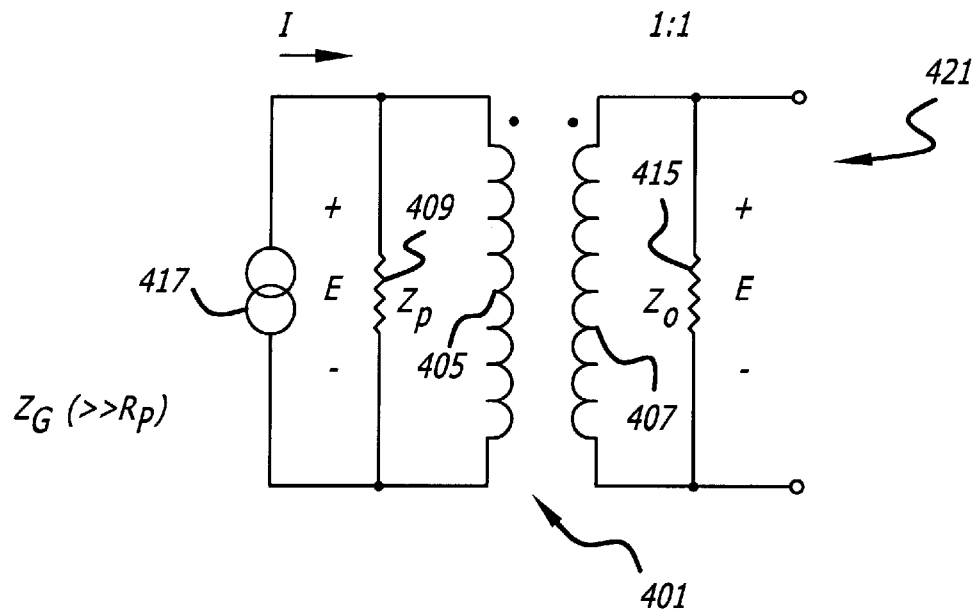
FIG. 4 is a schematic of a data communications circuit utilizing an isolation transformer with a turns ratio of 1:1 in accordance with the teachings of the present invention.

FIG. 4 is a schematic of a 1:1 isolation transformer 401 of a data communications output circuit. In one embodiment, the data communications circuit of FIG. 4 may be a standard 10BASE-T or 100BASE-TX Ethernet output circuit or the like. In one embodiment, a current generator 417, having a relatively high impedance $Z_G$, supplies a current I into a primary load resistor 409, which is coupled in parallel with a primary winding 405 of transformer 401. A data communications line 421 is coupled to secondary winding 407 of isolation transformer as shown in FIG. 4. In one embodiment, data communications line 421 is an unshielded twisted pair (UTP) data communications cable, which in one embodiment has a characteristic impedance of about 100 ohms. In FIG. 4, the characteristic impedance is represented as a secondary load resistor 415 having an impedance of $Z_0$. In one embodiment, primary load resistor 409 has an impedance $Z_P$, which is equal to $Z_0$, which is equal to 100 ohms, thereby resulting in the entire circuit being impedance matched.

In one embodiment, the voltage drop produced across primary load resistor 409 in response to current I is voltage E. For purposes of this discussion, transformer 401 may be considered lossless such that the same voltage E appears across secondary load resistor 415, and therefore on data communications line 421.

In one embodiment, a current generator 417 furnishes a current drive signal that is closely controlled with-respect to symmetry of output and rise and fall times. Thus, the terminals of current generator 417 are able to swing between the extreme voltages of the output data signal. For instance, the data communications circuit of FIG. 4 in one embodiment is able to produce 5 volt peak-to-peak signals for standard 10BASE-T signals if current generator 417 is operated with a DC supply voltage of 5 volts DC. However, with the continuing trend towards integrated circuits operating at lower voltage, the circuit of FIG. 4 would be unable to furnish or tolerate the required 5 volt peak-to-peak voltage swings with sufficient fidelity for satisfactory performance.

Figure 5:
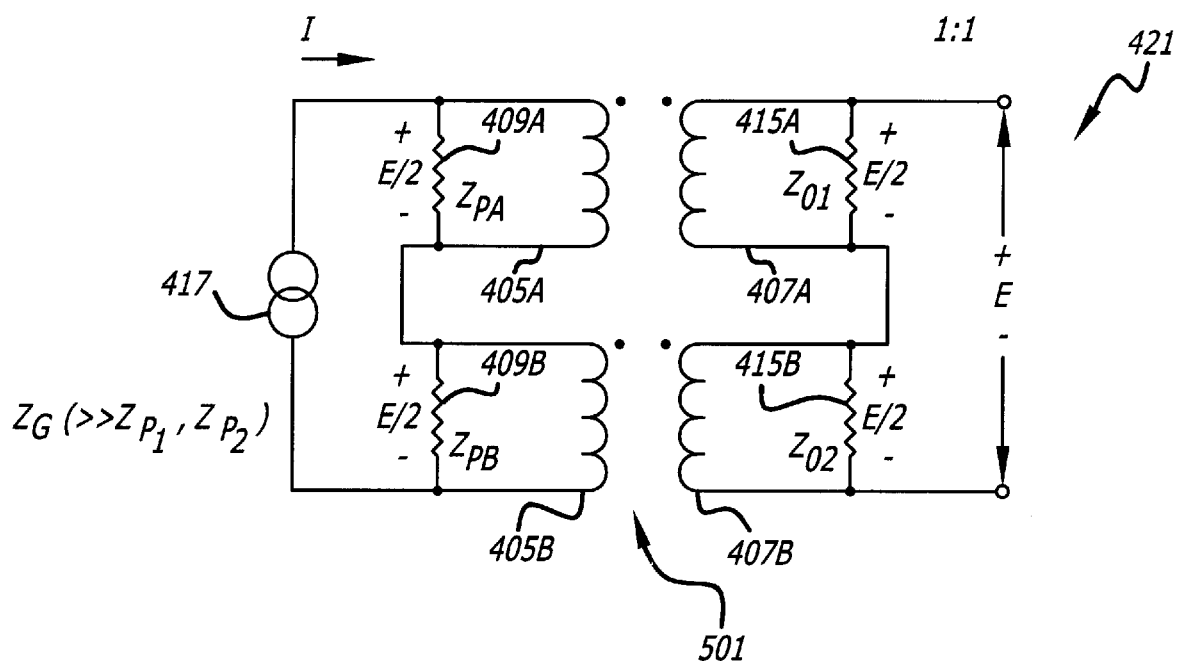
FIG. 5 is a schematic of a data communications circuit utilizing an isolation transformer having a turns ratio of 1:1 with the primary and secondary windings split in half and the primary load resistor and characteristic impedance of the data communications line split in half in accordance with the teachings of the present invention.

In FIG. 5, the data communications circuit is rearranged so that the primary winding of transformer 501 is split in half into primary windings 405A and 405B, and the secondary winding is split into secondary windings 407A and 407B, respectively. Correspondingly, the primary load resistor is split in half into primary load resistors 409A and 409B, which are coupled across primary windings 405A and 405B, respectively.

As can be seen, each of the secondary windings 407A and 407B effectively operate into half of the characteristic impedance of data communications line 421. The split characteristic impedance is represented in FIG. 5 as secondary load resistors 415A and 415B, each having an impedance of $Z_{01}$ and $Z_{02}$, respectively. In one embodiment, $Z_{01}$ and $Z_{02}$ are both equal to half of $Z_0$. Similarly, $Z_{PA}$ and $Z_{PB}$ are both equal to half of $Z_P$. In one embodiment, primary load resistors 409A and 409B and secondary load resistors 415A and 415B each have an impedance of 50 ohms. Therefore, the composite impedance across primary windings 405A and 405B is matched with the characteristic impedance across secondary windings 407A and 407B.

As can be appreciated to those skilled in the art, the circuit of FIG. 5 is an electrically equivalent circuit to the data communications circuit illustrated in FIG. 4. A current I produced by current generator 417 generates a primary voltage E/2 across each series coupled primary load resistor 409A and 409B resulting in an overall primary voltage E produced across primary windings 405A and 405B. Since secondary windings 407A and 407B are magnetically coupled to primary windings 405A and 405B through 1:1 transformer 501, a voltage of E/2 is generated across each secondary load resistor 415A and 415B. Thus, an overall summed voltage of E is produced in data communications line 421. As can be seen, each half of the primary and secondary windings only furnish half of the total voltage E.

Figure 6:
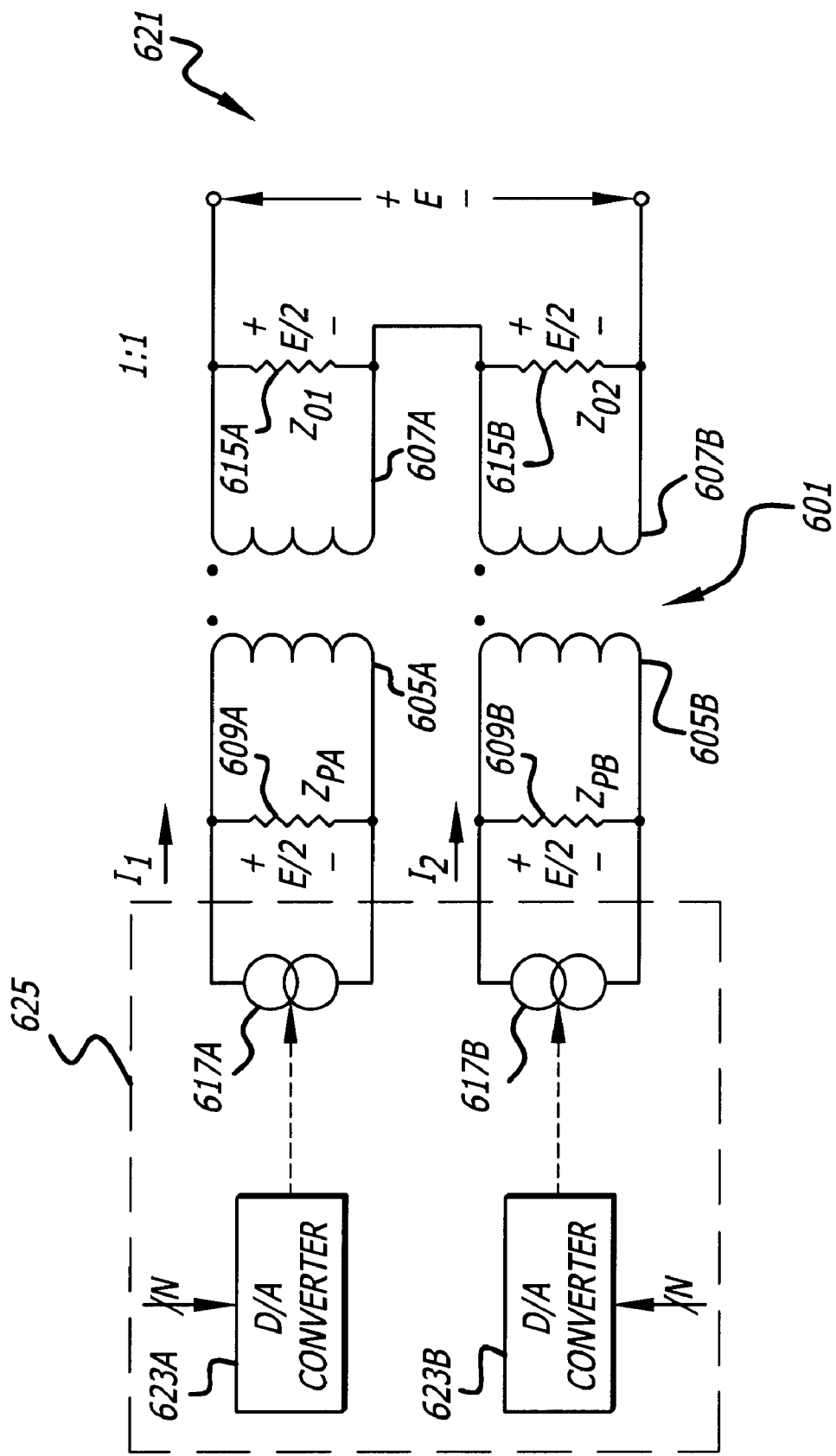
FIG. 6 is a schematic of a data communications circuit utilizing an isolation transformer having a 1:1 turns ratio with the secondary winding split in half, the characteristic impedance of the data communications line split in half, and the primary winding separated into two windings with half of the primary load resistor coupled across each separate primary winding in accordance with the teachings of the present invention.

FIG. 6 is a schematic of a data communications circuit in accordance with the teachings of the present invention. Instead of a single current generator being used to furnish current I to produce a voltage E, a plurality of current generators 617A and 617B are each used to furnish concurrently a component of the total output signal as shown in FIG. 6. In one embodiment, an isolation transformer 601 is shown having its primary winding divided into two separate primary windings 605A and 605B. Current generator 617A is coupled to the ends of primary winding 605A with a primary load resistor 609A coupled in parallel across primary winding 605A. Primary winding 605B is coupled to current generator 617B with primary load resistor 609B coupled in parallel across primary winding 605B.

In one embodiment, transformer 601 is a pulse-type or data communications transformer. Accordingly, transformer 601 transfers signals while retaining the wave shape with a high degree of fidelity. Thus, in one embodiment, transformer 601 is relatively broad band tuned and has a relatively quick response in the time domain when compared to other transformers such as radio transformers and/or power transformers.

In one embodiment, D/A converter 623A is coupled to current generator 617A to control the generated component output current 11. In one embodiment, D/A converter 623A receives an N-bit digital input to generate an analog signal to control current generator 617A. In one embodiment, D/A converter 623B is also coupled to receive N-bits to generate an analog output coupled to current generator 617B to control the component output current 12. In one embodiment, D/A converters 623A and 623B each receive separate 6-bit digital signals. In another embodiment, the same D/A converter, such as for example D/A converter 623A or D/A converter 623B, may be coupled to both current generators 617A and 617B to produce component output currents 11 and 12 respectively.

Similar to the circuit illustrated in FIG. 5, the secondary winding of transformer 601 is split in half into secondary winding 607A and 607B. Each of the secondary windings 607A and 607B effectively operate into half of the characteristic impedance of data communications line 621. This aspect of the present invention is illustrated as secondary load resistors 615A and 615B, each of which has an impedance of $Z_{01}$ and $Z_{02}$, respectively. Secondary load resistor 615A is coupled in parallel with secondary winding 607A and secondary load resistor 615B is coupled in parallel with secondary winding 607B. In one embodiment, $Z_{PA}$, $Z_{PB}$, $Z_{01}$ and $Z_{02}$ all equal 50 ohms.

Since in one embodiment the voltage generated across primary load resistors 609A and 609B is only E/2, each current generator 617A and 617B only work to furnish half of the total load. Therefore, in one embodiment, current generator 617A and 617B as well as D/A converters 623A and 623B may be included in a lower voltage physical layer 625 of an integrated circuit, even though the voltage, E, generated on data communications line 621 is a higher level.

Figure 1A:
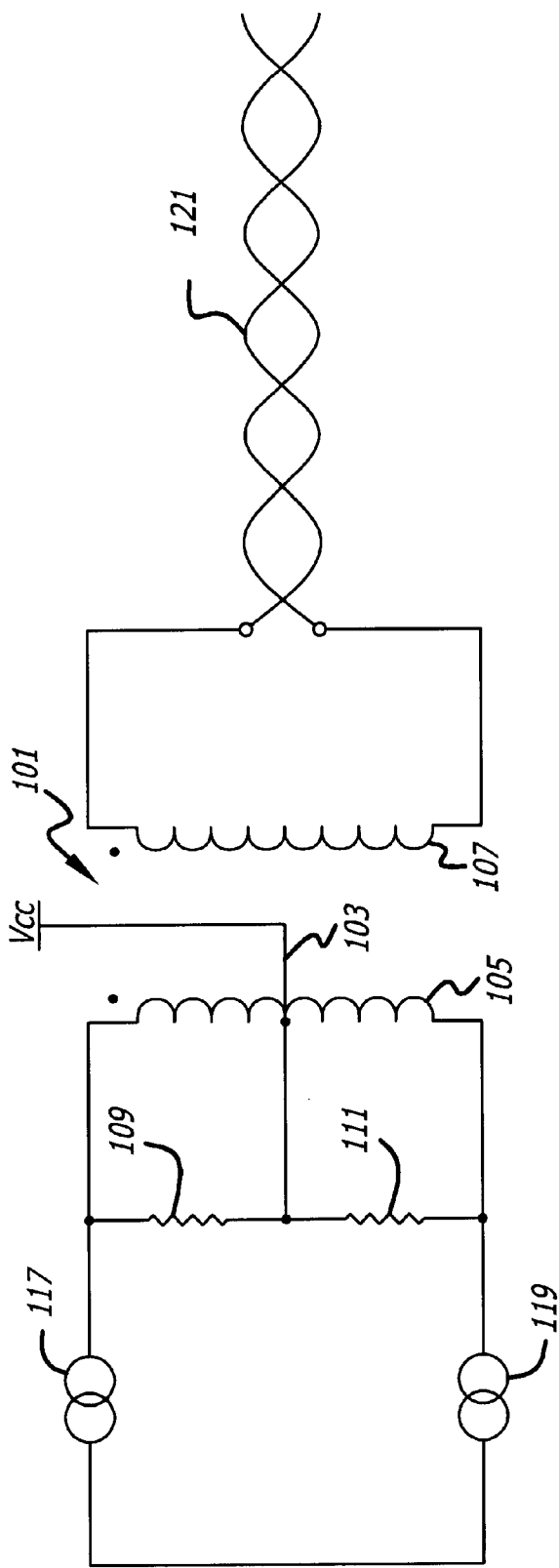
FIG. 1A is a schematic of a data communications circuit using an isolation transformer with a center-tap on the primary winding.
Figure 1B:
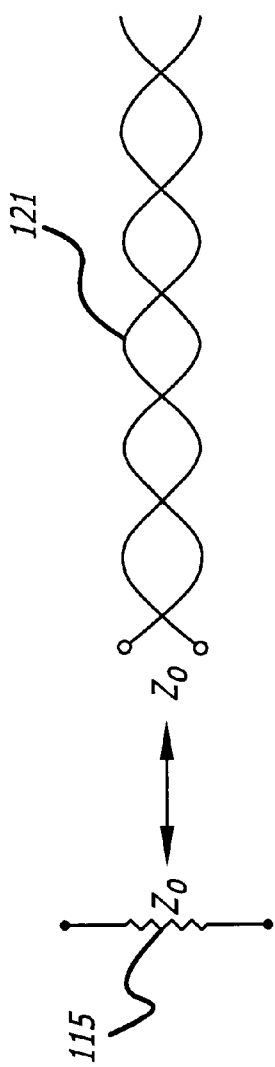
FIG. 1B is a schematic illustrating a data communications line being represented by its characteristic impedance.
Figure 2:
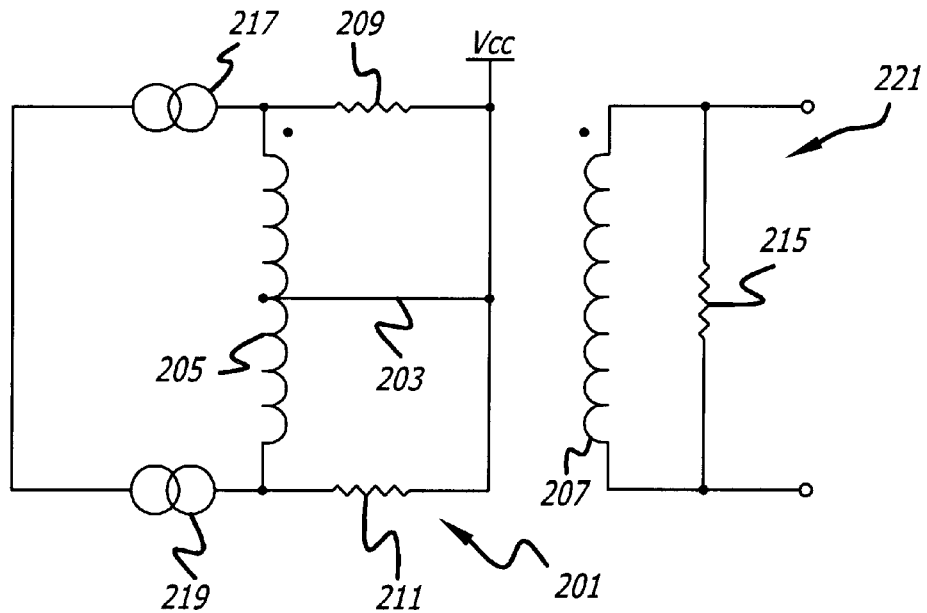
FIG. 2 is a schematic of another data communications circuit using an isolation transformer with a center-tap on the primary winding.

It is appreciated that because the data communications circuit of the present invention produces full output voltages without a center tap, in contrast to the circuits illustrated above in FIGS. 1 and 2, no autotransformer action is required in transformer 601. Therefore, transformer 601 does not suffer from the inherent second harmonic distortions manifested as common-mode signal currents and EMI.

Figure 3:
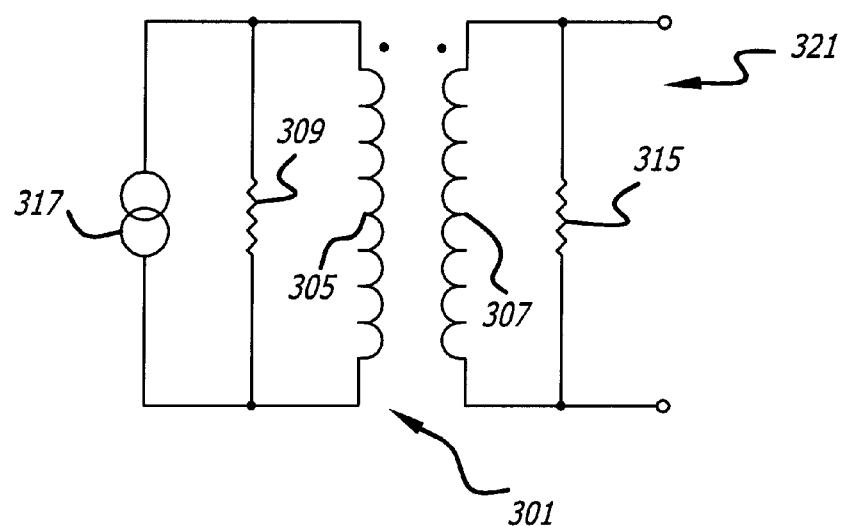
FIG. 3 is a schematic of a data communications circuit utilizing a step-up transformer to generate high level signal voltage levels on a data communications line.

Furthermore, since the data communications circuit of the present invention produces full output voltages using a 1:1 isolation transformer 601 instead of a step-up type transformer, such as for example transformer 301 illustrated in FIG. 3, the windings are much easier to manufacture and the impedances are much easier and more practical to match throughout the data communications circuit. Indeed, with step-up type transformers, irregular windings with fractional turns ratios as well as impractical low impedance values would be utilized.

In one embodiment, current generators 617A and 617B are high impedance current generators. It is appreciated that by utilizing high impedance current generators instead of voltage generators, the impedance matching of the presently described data communications circuit is maintained during high and low current situations as well as when current generators 617A and 617B are turned completely off, such as when there is no data being transmitted. This is helpful to avoid excessive cross-talk between multiple wires in data cables.

In one embodiment, current generators 617A and 617B are synchronized. In another embodiment, current generators 617A and 617B are not synchronized. In the latter embodiment, the resulting voltages of E/2 will correspondingly have non-synchronized instantaneous alignment. In this embodiment, the contributory output signals or magnetomotive forces in secondary windings 607A and 607B are constructively and/or destructively summed to produce the higher voltage output signal on data communications line 621. If current generators 617A and 617B are synchronized, or are in phase with one another, then the component output voltage waveforms generated across each respective primary load resistor will be synchronized, thereby producing synchronized voltages across their respective secondary windings 607A and 607B. In this embodiment, D/A converter 623A and 623B produce the same analog signals to control current generator 617A and 617B, respectively. In another embodiment, synchronized waveforms may be produced using a single D/A converter, 623A or 623B, used to control each current generator 617A and 617B. These aspects of the present invention with synchronized and non-synchronized waveforms being produced by current generators 617A and 705B. Each primary winding in the plurality of M separate primary windings contains a number of turns are discussed in greater detail below with respect to FIGS. 8 and 9.

Figure 7:
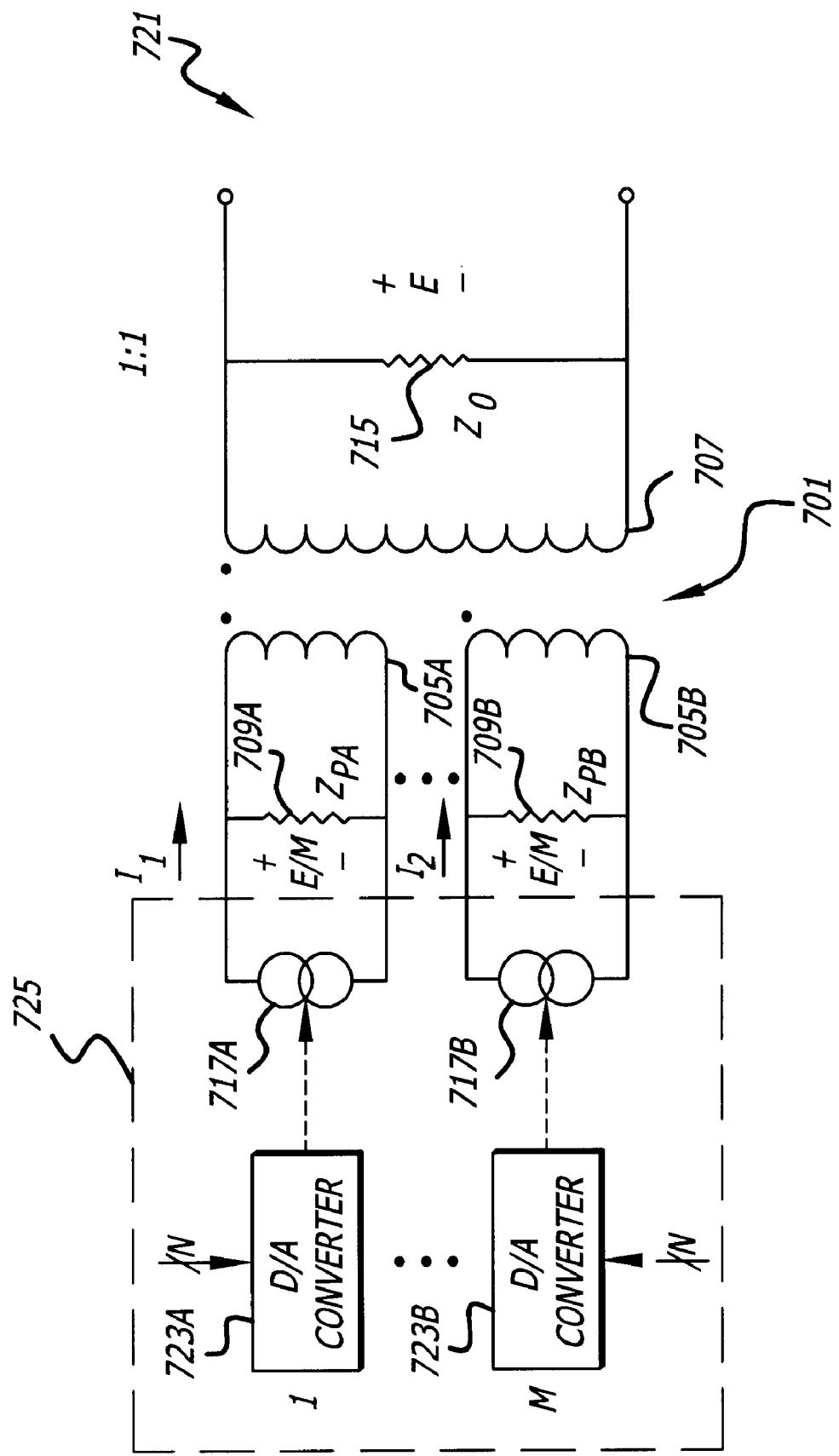
FIG. 7 is a schematic of a data communications circuit utilizing an isolation transformer having a 1:1 turns ratio with the primary winding separated into a plurality of separate windings and the appropriate separate primary load resistances coupled across each separate primary winding such that the entire data communications circuit is impedance matched in accordance with the teachings of the present invention.

FIG. 7 is a schematic of another embodiment of a data communications circuit in accordance with the teachings of the present invention. As shown in FIG. 7, a 1:1 isolation transformer 701 has a plurality of M separate primary windings, shown as primary windings 705A through 705B. Each primary winding is coupled to a separate independently controlled current generator. In one embodiment, current generator 717A is coupled to primary winding 705A with primary load resistor 709A coupled in parallel with primary winding 705A. Current generator 717B is coupled to primary winding 705B with primary load resistor 709B coupled in parallel with primary winding 705B.

In one embodiment, D/A converter 723A receives an N-bit digital signal and converts it to an analog signal to control current generator 717A. D/A converter 723B receives an N-bit digital control signal and converts it to an analog signal used to control current generator 717B. As shown in FIG. 7, D/A converters 723A through 723B and current generators 717A through 717B are included in the lower voltage physical layer 725 of an integrated circuit, even though a higher voltage is generated on data communications line 721. In one embodiment, 1:1 isolation transformer 701 also includes a secondary winding 707 which is magnetically coupled to primary windings 705A through 705B through a magnetic core. The secondary winding 707 has a number of turns equal to the total number of turns in the plurality of M separate primary windings. In one embodiment, a ferrite toroid common magnetic core is used for 1:1 isolation transformer 701. Secondary winding 707 is coupled to data communications line 721, which has a characteristic impedance represented as secondary load resistor 715.

Assuming that there are a total of M primary windings 705A through 705B, each primary load resistor 709A through 709B in one embodiment has an impedance equal to $Z_0/M$. For example, assuming M equals 2 and $Z_0$ equals 100 ohms, each primary resistor 709A through 709B has an impedance of 50 ohms. In one embodiment, current generator 717A generates current 11 and current generator 717B generates current 12.

In an embodiment where current generators 717A through 717B are synchronized, the current generators may be implemented as separate but concurrently controlled integrated circuit elements. Since primary windings 705A through 705B are separate, each current generator 717A through 717B may be ground and power supply referenced as needed for proper current generator operation at the reduced voltage.

As discussed above, the overall turns ratio of transformer 701 is 1:1. The circuit illustrated in FIG. 7 differs from the circuit illustrated in FIG. 4 in that the primary winding 405 of FIG. 4 has been separated to allow each current generator 717A through 717B to supply its portion of the totally required magnetomotive force. In an embodiment with two primary windings, each primary load resistor 709A through 709B is only half of the original value, instead of being only one fourth of the original value as the circuit illustrated in FIG. 3 above. It is appreciated that primary load resistors being only half the original value instead of one fourth the original value are more practically realizable on impedance matched printed circuit boards.

In an embodiment with a total of two primary windings being utilized in FIG. 7, transformer 701 may be manufactured as a transformer illustrated in FIG. 6 with four separate windings being applied to a common magnetic core. In one embodiment, the partial transformer secondary windings 407A and 407B of FIG. 5, or the partial transformer secondary windings 607A and 607B of FIG. 6, are coupled together in series to produce the single secondary winding 707 of FIG. 7. The remaining separate windings are utilized for primary windings 705A through 705B. By using four identical windings in one embodiment, very accurate matching of the windings may be achieved. In one embodiment, the windings are applied as a multifilar group, resulting in improved frequency response characteristics as well as reduced parasitic capacitances.

In an embodiment that utilizes more than two primary windings 705A through 705B in 1:1 transformer 701, a corresponding number of partial circuits and current generators may be used. In one embodiment, there are three primary windings 705A through 705B. In such an embodiment, the component output voltage generated across each primary load resistor 709A through 709B is E/3. By increasing the number of contributory current generators 717A through 717B, the primary load impedances are similarly divided so that each current generator 717A through 717B supplies the same current into the magnetic system. Accordingly, even lower voltages for physical layers 725 may be accommodated to generate higher voltage level communications signals on data communications line 721.

It is noted that the currents that are supplied using D/A converters are capable of producing only certain discrete values of drive currents. If the exact time alignment of the multiple current generators is varied so that they do no operate in exact synchronism, then it is possible to produce magnetomotive forces and corresponding data cable signals that have values that are not attainable with all generators operating in concert. This effect of independently operating each current generator with different non-synchronized signals being generated by each current generator may be utilized for wave shaping purposes in accordance with the teachings of the present invention or for achieving more precise currents from current generators with a given limited digital precision or resolution.

Figure 8:
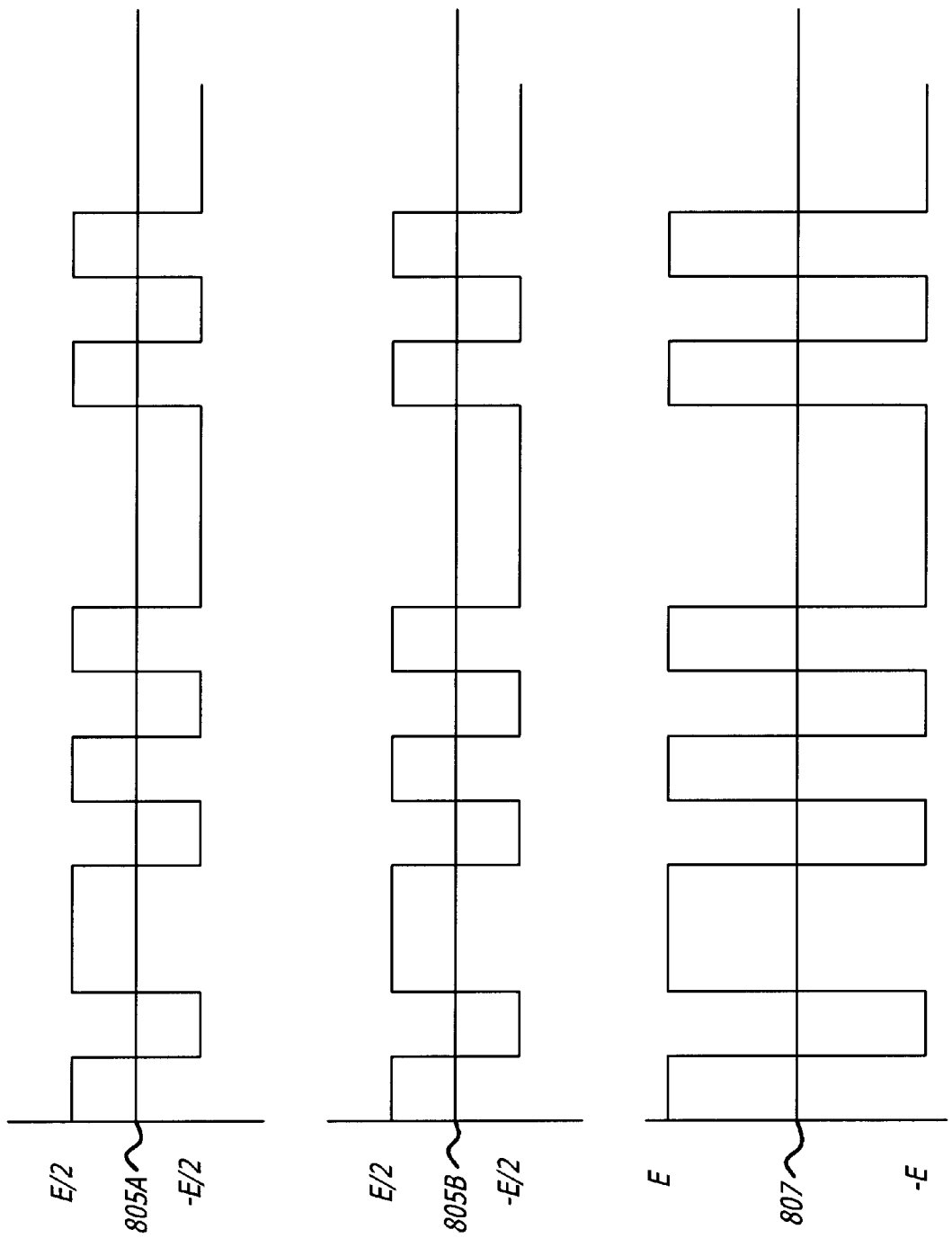
FIG. 8 is a timing diagram illustrating waveforms of an isolation transformer with a 1:1 turns ratio having separate primary windings with synchronized lower voltage contributory output signals in accordance with the teachings of the present invention.

FIG. 8 is an illustration of a timing diagram showing current generators producing currents that are synchronized with one another in accordance with the teachings of the present invention. For instance, assume that waveform 805A of FIG. 8 corresponds to a voltage generated across primary load resistor 709A of FIG. 7 in response to current from current generator 717A, and that waveform 805B corresponds to the voltage generated across primary load resistor 709B of FIG. 7 in response to current from current generator 717B. In the embodiment illustrated in FIG. 8, there are the two current generators 717A and 717B, each generating contributory output currents in synchronism such that waveforms 805A and 805B are in phase with one another. As shown in FIG. 8, waveform 807 is generated in communications line 721 with transformer 701 summing waveforms 805A and 805B in accordance with the teachings of the present invention. It is noted that because since the current generators 717A and 717B are operated in synchronism, waveform 807 has the same amplitude resolution as waveforms 805A and 805B.

Figure 9:
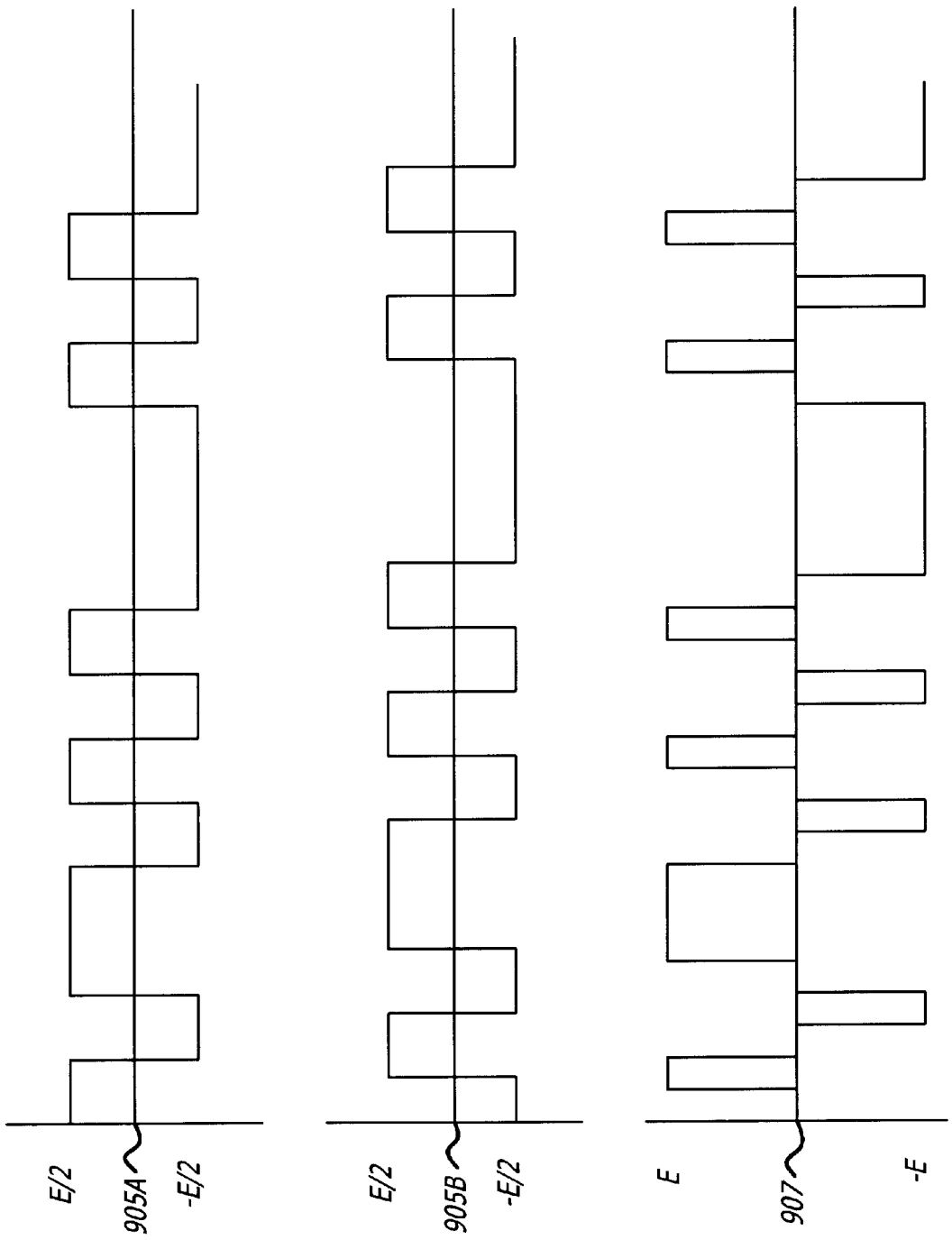
FIG. 9 is a timing diagram illustrating waveforms of an isolation transformer with a 1:1 turns ratio having separate primary windings with non-synchronized lower voltage contributory output signals in accordance with the teachings of the present invention.

FIG. 9 is an illustration of waveforms that are generated with another data communications circuit in accordance with the teachings of the present invention. In the embodiment illustrated, the current generators are independently operated non-synchronously such that the waveforms produced by each respective current generator are not the same. In particular, waveform 905A corresponds to the voltage generated across primary load resistor 709A. Waveform 905B corresponds to the voltage generated across primary load resistor 709B. Waveform 907 corresponds to the summed signal generated on data communications line 721.

In the embodiment illustrated in FIG. 9, current generators 717A and 717B generate waveforms that are different from one another. As a result, waveform 907 has greater resolution than the resolution of the signals generated by current generator 717A and 717B. For instance, in the embodiment illustrated in FIG. 9 how waveforms 905A and 905B have two discrete values as the represent binary data transmissions. It is appreciated that in other embodiments of the present invention, waveforms 905A and 905B have more than two discrete values. Since waveform 907 is generated by summing waveforms 905A and 905B, waveform 907 has at least three discrete values, +E, 0 and −E, as shown in FIG. 9. Accordingly, by generating component output waveforms non-synchronously with current generators 717A through 717B, summed waveforms of increased voltage and resolution may be generated on data communications line 721 in accordance with the teachings of the present invention.

Thus, a data communications circuit producing high level signals from lower level signals on an integrated circuit has been described. The described data communications circuit sums partial signal currents and magnetomotive forces producing high quality high level signals using low voltage integrated circuit drivers and simplified magnetic components.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method comprising:
    generating a plurality of output signals with a plurality of current generators by at least (i) converting a plurality of N-bit digital input signals to a plurality of analog signals, and (ii) coupling one of the plurality of analog signals to a corresponding one of the plurality of current generators, the plurality of current generators being included in a lower voltage physical layer of an integrated circuit;
    driving one of a plurality of primary windings of a transformer by coupling one of the plurality of output signals to the one of the plurality of primary windings; and
    summing currents of the plurality of output signals in the plurality of primary windings to generate a higher voltage output signal in a secondary winding of the transformer.

2. The method of claim 1, wherein the transformer has an overall turns ratio of 1:1.

3. The method of claim 2 wherein generating the plurality of output signals with the plurality of current generators comprises generating the plurality of output signals in phase with one another.

4. The method of claim 2 wherein generating the plurality of contributory output signals with the plurality of current generators comprises generating the plurality of output signals out of phase with one another.

5. The method of claim 2 further comprising controlling one of the plurality of current generators.

6. The method of claim 2 wherein summing currents of the plurality of output signals in the plurality of primary windings comprises coupling the plurality of primary windings and the secondary winding through a ferrite toroid core.

7. The method of claim 2 further comprising:
    coupling a data communications line to the secondary winding; and
    matching a composite impedance across the plurality of primary windings with a characteristic impedance across the secondary winding.

8. The method of claim 7 wherein coupling the data communications line to the secondary winding comprises coupling an unshielded twisted pair (UTP) data communications line to the secondary winding.

9. The method of claim 7 wherein coupling the data communications line to the secondary winding comprises coupling an Ethernet data communications line to the secondary winding.

10. The method of claim 7 wherein matching the composite impedance across the plurality of primary windings with the characteristic impedance across the secondary winding comprises coupling one of a plurality of primary load resistors, each having a first impedance, across a corresponding one of the plurality of primary windings, wherein a combined sum of all of the first impedances is substantially equal to the characteristic impedance across the secondary winding.

11. A data communications circuit comprising:
a pulse-type transformer including a secondary winding magnetically coupled to a plurality of separate primary windings;
a data communications line coupled to the secondary winding;
a plurality of independently controllable current generators, each one of the current generators concurrently driving a corresponding one of the primary windings, each one of the current generators included in a lower voltage physical layer of an integrated circuit and generating a corresponding contributory output signal, the pulse-type transformer summing currents of the contributory output signals and generating a higher voltage output signal in the data communications line; and
a plurality of digital-to-analog (D/A) converters, each one of the plurality of D/A converters coupled to a corresponding one of the plurality of independently controllable current generators.

12. The data communications circuit of claim 11, further comprising:
a plurality of primary load resistors, each one of primary load resistors coupled across a corresponding one of the primary windings, each one of the primary load resistors having a first impedance such that a combined sum of all the first impedances is substantially equal to a characteristic impedance across the data communications line.

13. The data communications circuit of claim 12 wherein a combined sum of a number of turns in all of the plurality of separate primary windings is equal to a total number of turns in the secondary winding such that the pulse-type transformer has an overall turns ratio of 1:1.

14. The data communications circuit of claim 11 wherein each one of the plurality of D/A converters is coupled to receive a corresponding digital input signal and generate a corresponding analog output signal coupled to the corresponding one of the plurality of independently controllable current generators, the corresponding one of the plurality of independently controllable current generators generating the corresponding contributory output signal in response to the corresponding digital input signal.

15. The data communications circuit of claim 14 wherein the corresponding digital input signal coupled to each one of the plurality of D/A converters comprises N-bits and the higher voltage output signal has a resolution greater than or equal to N-bits.

16. The data communications circuit of claim 12 wherein the data communications line comprises an Ethernet data communications line.

17. The data communications circuit of claim 12 wherein the higher voltage output signal comprises a binary data transmission.

18. The data communications circuit of claim 12 wherein the data communications line comprises an unshielded twisted pair (UTP) data communications line.

19. The data communications circuit of claim 12 wherein the corresponding contributory output signal generated by each one of the plurality of independently controllable current generators are in phase with one another.

20. The data communications circuit of claim 12 wherein the corresponding contributory output signal generated by each one of the plurality of independently controllable current generators are out of phase with one another.

21. The data communications circuit of claim 12 wherein the higher voltage output signal comprises a signal less than or equal to an approximately 5 volt peak-to-peak signal.

22. The data communications circuit of claim 12 wherein the characteristic impedance represents as a secondary load resistor.

23. The data communications circuit of claim 12 wherein the lower voltage physical layer of the integrated circuit operates at a voltage less than or equal to approximately 3.3 volts.

24. The data communications circuit of claim 12 wherein the lower voltage physical layer of the integrated circuit operates at a voltage less than or equal to approximately 2.2 volts.

25. The data communications circuit of claim 12 wherein the pulse-type transformer further comprises a common ferrite toroid magnetic core.

* * * * *